No. 816,384. PATENTED MAR. 27, 1906.
E. W. SCHNEIDER.
BATTERY.
APPLICATION FILED AUG. 11, 1905.
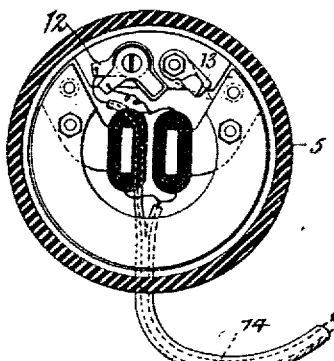
Fig. 1.
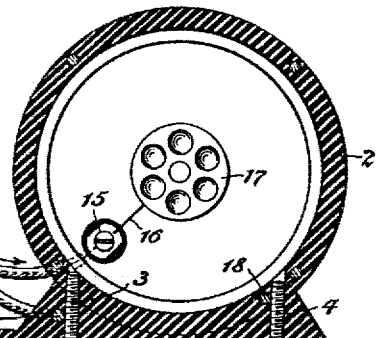
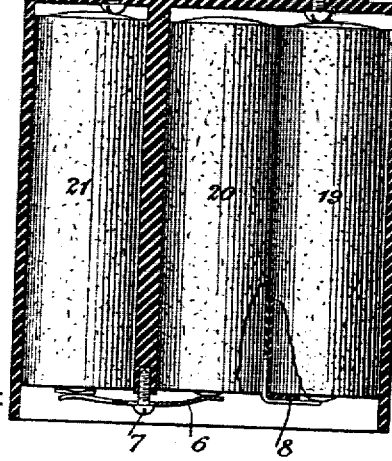
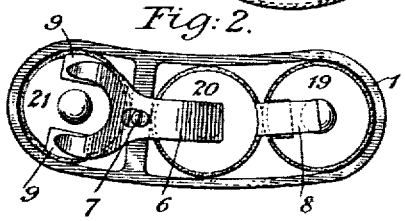
Fig. 2.
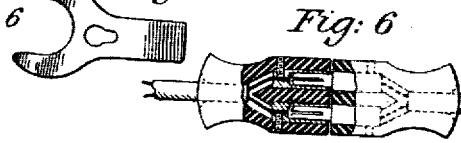
Fig. 3.    Fig. 6.
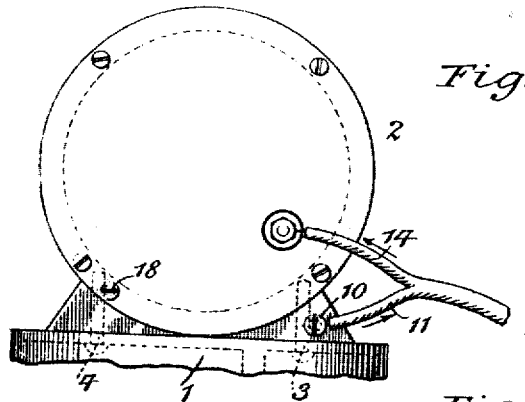
Fig. 4.
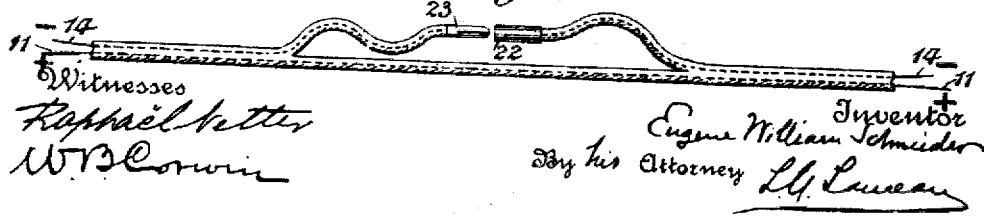
Fig. 5.
Witnesses
Raphael Netter
W. B. Corwin
Inventor
Eugene William Schneider
By his Attorney
L. G. Laureau

UNITED STATES PATENT OFFICE.

EUGENE WILLIAM SCHNEIDER, OF NEW YORK, N. Y., ASSIGNOR TO THE MEARS EAR PHONE COMPANY, OF NEW YORK, N. Y., A CORPORATION OF NEW YORK.

BATTERY.

No. 816,384.

Specification of Letters Patent.

Patented March 27, 1906.

Application filed August 11, 1905. Serial No. 274,017.

*To all whom it may concern:*

Be it known that I, EUGENE WILLIAM SCHNEIDER, a citizen of the United States, residing in the borough of Manhattan, city and county of New York, have invented certain new and useful Improvements in Batteries, of which the following is a specification.

My invention relates to improvements in batteries, and particularly to dry batteries, by means of which the life of such batteries may be lengthened by a simple manipulation, doing away with wiring between batteries and with switches or plugs.

The accompanying drawings show an apparatus suitable to the carrying out of my invention, although I do not limit myself to the exact construction shown, as changes may be made in the apparatus without changing its mode of operation nor the effect produced.

In order to show a practical example of my invention, I have shown it in connection with a portable audiphone; but it must be understood that it is applicable to all cases where batteries are used and where it is desired to lengthen the life of the battery system—such as, for instance, in ignition devices for explosive-engines, &c.

Figure 1 is a cross-section through the battery-case, showing the transmitter of an audiphone in place with its connections with the battery and earpiece, the front being removed and the earpiece being shown in section. Fig. 2 is a plan view of the open end of the battery-case with the cells in place. Fig. 3 is a plan view of the forked spring to hold the cells in position and make the proper connection between the same. Fig. 4 is a part rear elevation of the apparatus, showing the transmitter in place with outside connections to the earpiece. Figs. 5 and 6 show a modification in the manner of interrupting the current.

The device consists of a battery-case of insulating material 1, closed at one end and divided into two compartments of unequal size, one compartment being of sufficient size to hold two cells side by side, the other holding one only. The cells are maintained in place by means of a forked spring 6, which slides under screw 7 and may be detached when the cells are to be displaced or replaced. In the example shown the top of the battery-case is permanently closed, and the transmitter 2 is connected to the battery by means of metallic screws 3 and 4. An earpiece 5 is connected to the transmitter by the usual wiring. The two cells 19 20 in the larger compartment are permanently connected in series by means of the metallic lug 8, which reaches from the carbon of the cell 19 to the zinc sheath of the cell 20. When the device is first put in use, the forked spring 6, being forced under the screw 7, maintains all the cells in place, the cell 21 being at that time in the case with its carbon end down, the lugs 9 9 thereof being also down. The two ends of the fork of the spring 6 thus bear upon the lugs 9 9 and the carbon of the cell 20. It will be seen that as long as cell 21 remains in this position it will not be called upon to furnish current, because the circuit will take place simply through the forked spring 6, the lugs 9 9, and the zinc sheath of cell 21. When, however, the cells 19 and 20 have about lost their strength, the forked spring is removed and cell 21 is reversed end for end, which brings the carbon element of the cell 21 into contact with the metallic screw 3. By so doing and replacing the forked spring in its original position the three cells will be connected in series, the third cell 21 being placed in the generating-circuit of the battery to boost up the other cells and maintain the current for an additional length of time.

It will be seen that the throwing in of the boosting-cell is done in a perfectly simple manner without wiring between the cells and without switches or plugs.

The operation of the device will be easily understood. At the start the current developed in the cells 19 and 20 follows the zinc sheath of the cell 21 and passes through the upper end of the battery-case through screw 3, and hence to draw-screw 10, which forms an outer binding-post to which the wire 11, leading to the earpiece, is attached. This wire properly divided distributes the current between the electromagnets of the earpiece, which are thus connected in parallel. The current then passes out of the magnets through the leading-out wires, as shown on Fig. 1. These wires are connected with one of the plates of a switch 12, the closing member of which is the knife 13. The return-wire 14 is attached to the other plate of the switch, from which it is properly insulated and leads the current to binding-post 15, which goes through the metallic back of the transmitter and from which it is insulated. The circuit continues from binding-post 15 through internal wire 16 to electrode 17. From the electrode the current passes to the diaphragm and from the diaphragm to the metallic back of the transmitter, then from screw 18 to screw 4, and back to the negative end of cell 19.

When cells 19 and 20 begin to show signs of exhaustion, forked spring 6 is removed, cell 21 is reversed end for end, and forked spring 6 is put back in place. The instrument then can be used till complete exhaustion of the three cells, which are thus connected in series.

I have shown a current-interrupter in the earpiece; but this may be placed in any convenient place in the circuit—as, for instance, in the wires connecting the transmitter to the earpiece, as shown in Fig. 5, where wire 14 is provided with female plug 22 and male plug 23. To close the circuit, plug 23 is placed in plug 22. When the plugs are disconnected, the current is interrrupted, and the battery is at rest. The current may also be interrupted by placing double male and female plugs at some point of the cord connection between the transmitter and the earpiece, as shown in Fig. 6. It will easily be understood that by pulling the male plugs out of contact the current will be broken, the earpiece becoming entirely detached from the transmitter and battery.

What I claim is—

1. A battery composed of a plurality of cells, and means whereby one of said cells by an end-to-end reversal thereof may be thrown into or out of the generating-circuit of the battery.

2. A battery composed of a plurality of cells, one of said cells in one position thereof acting merely as a conductor of the battery-current and not as a generator, and means whereby said cell by an end-to-end reversal thereof may be thrown into the generating-circuit of the battery.

3. A two-compartment battery-case containing two battery-cells in one compartment and one battery-cell in the other compartment, said last-named cell in one position thereof acting merely as a conductor of the battery-current and not as a generator, and means whereby said cell by an end-to-end reversal thereof may be thrown into the generating-circuit of the battery.

In witness whereof I affix my signature in the presence of two witnesses.

EUGENE WILLIAM SCHNEIDER.

Witnesses:
J. G. PRATT,
E. C. SHAPPERT.